(12) United States Patent
Hosokawa et al.

(10) Patent No.: US 8,586,648 B2
(45) Date of Patent: *Nov. 19, 2013

(54) AQUEOUS COLORANT DISPERSION, PRODUCTION METHOD OF AQUEOUS COLORANT DISPERSION, AND AQUEOUS INK FOR INKJET RECORDING

(75) Inventors: Takafumi Hosokawa, Ashigarakami-gun (JP); Misato Sasada, Ashigarakami-gun (JP); Naoya Shibata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 496 days.

This patent is subject to a terminal disclaimer.

(21) Appl. No.: 12/391,894

(22) Filed: Feb. 24, 2009

(65) Prior Publication Data

US 2009/0221742 A1    Sep. 3, 2009

(30) Foreign Application Priority Data

Feb. 29, 2008  (JP) .................................. 2008-049994
Aug. 26, 2008  (JP) .................................. 2008-216650

(51) Int. Cl.
*C08L 31/02*    (2006.01)

(52) U.S. Cl.
USPC ....... 523/160; 523/161; 106/31.13; 106/31.6; 516/9; 516/19; 524/200; 524/205; 524/206; 524/305; 524/457; 524/336; 524/339; 524/558; 427/520

(58) Field of Classification Search
USPC ......... 523/160, 161, 200, 205, 206, 305, 336, 523/339; 106/31.13, 31.6, 31.1; 516/9, 19; 524/558, 560, 457; 427/520
See application file for complete search history.

(56) References Cited

U.S. PATENT DOCUMENTS

| | | | |
|---|---|---|---|
| 4,665,107 A | 5/1987 | Micale | |
| 5,049,322 A | 9/1991 | Devissaguet et al. | |
| 6,011,098 A | 1/2000 | Kashiwazaki et al. | |
| 6,074,467 A * | 6/2000 | Tabayashi et al. | 106/31.65 |
| 6,262,152 B1 | 7/2001 | Fryd et al. | |
| 6,590,012 B2 | 7/2003 | Miyabayashi | |
| 8,178,597 B2 * | 5/2012 | Sasada et al. | 523/160 |
| 2004/0080574 A1 | 4/2004 | Masumi | |
| 2005/0075416 A1 | 4/2005 | Miyabayashi | |
| 2005/0090599 A1 | 4/2005 | Spinelli | |
| 2005/0124726 A1 | 6/2005 | Yatake et al. | |
| 2005/0176877 A1 | 8/2005 | Miyabayashi | |
| 2006/0014855 A1 | 1/2006 | House et al. | |
| 2006/0142417 A1 | 6/2006 | Kaneko et al. | |
| 2006/0223908 A1 * | 10/2006 | Szajewski et al. | 523/160 |
| 2007/0206053 A1 | 9/2007 | Kasai | |
| 2007/0229577 A1 | 10/2007 | Morimoto | |
| 2007/0263054 A1 | 11/2007 | Yatake et al. | |
| 2007/0287770 A1 * | 12/2007 | Nishiguchi et al. | 523/160 |
| 2008/0090027 A1 | 4/2008 | Li et al. | |
| 2009/0088521 A1 | 4/2009 | Hosokawa et al. | |
| 2009/0131577 A1 | 5/2009 | Kato et al. | |
| 2009/0163646 A1 * | 6/2009 | Kato et al. | 524/560 |
| 2009/0203823 A1 | 8/2009 | Sasada et al. | |
| 2009/0203833 A1 | 8/2009 | Sasada et al. | |
| 2009/0208652 A1 | 8/2009 | Sasada et al. | |
| 2009/0220748 A1 | 9/2009 | Kanaya et al. | |
| 2009/0221742 A1 | 9/2009 | Hosokawa et al. | |
| 2009/0234058 A1 | 9/2009 | Sasada | |
| 2009/0234065 A1 | 9/2009 | Sasada | |
| 2009/0239981 A1 | 9/2009 | Morimoto | |
| 2009/0311426 A1 | 12/2009 | Nakazawa et al. | |
| 2010/0063201 A1 | 3/2010 | Yamamoto | |
| 2010/0076148 A1 | 3/2010 | Shibata et al. | |
| 2010/0078592 A1 | 4/2010 | Li et al. | |
| 2011/0074867 A1 | 3/2011 | Nishimura et al. | |

FOREIGN PATENT DOCUMENTS

| | | |
|---|---|---|
| EP | 0 274 961 B1 | 7/1988 |
| EP | 1 153 991 A1 | 11/2001 |
| EP | 1 321 495 A1 | 6/2003 |
| EP | 1 621 587 A1 | 2/2006 |
| EP | 2 045 300 A1 | 4/2009 |
| EP | 2 075 269 A1 | 7/2009 |
| EP | 2 090 625 A2 | 8/2009 |
| EP | 2 090 626 A1 | 8/2009 |

(Continued)

OTHER PUBLICATIONS

Non-Final Office Action for copending U.S. Appl. No. 12/240,233 dated Dec. 29, 2010.
Extended European Search Report dated Jan. 27, 2009.
CAS reg. No. 56641-05-5, Nov. 16, 1984.
U.S. Office Action dated May 23, 2011, in U.S. Appl. No. 12/548,468.
U.S. Office Action dated Nov. 22, 2011, in U.S. Appl. No. 12/548,468.
EP Communication dated May 19, 2009, issued in EP Application No. 09152450.4, 6 pages.

(Continued)

*Primary Examiner* — Mark Kaucher
(74) *Attorney, Agent, or Firm* — Sughrue Mion, PLLC

(57) ABSTRACT

An aqueous colorant dispersion including a colorant (A), a polymer (B), and an aqueous liquid medium (I), wherein the polymer (B) is a copolymer including a hydrophilic structural unit and a hydrophobic structural unit, the content of the hydrophobic structural unit in the polymer (B) being more than 80% by mass but less than 100% by mass, the hydrophobic structural unit includes a hydrophobic structural unit (a) having an aromatic ring linked via a linking group to an atom included in the main chain of the polymer (B), the content of aromatic rings in the polymer (B) is 10% by mass or more but less than 20% by mass with respect to the mass of the polymer (B), the hydrophilic structural unit includes a hydrophilic structural unit (b) including an ionic group, and the polymer (B) includes a structural unit (c) different from the hydrophobic structural unit (a) and from the hydrophilic structural unit (b), the content of the structural unit (c) in the polymer (B) being more than 15% by mass but less than 90% by mass.

13 Claims, No Drawings

(56) References Cited

FOREIGN PATENT DOCUMENTS

| | | |
|---|---|---|
| JP | 3-221137 A | 9/1991 |
| JP | 3301082 B2 | 4/2002 |
| JP | 3444920 B2 | 6/2003 |
| JP | 2005-041994 A | 2/2005 |
| JP | 2005029598 | 2/2005 |
| JP | 2006-273891 A | 10/2006 |
| JP | 200751199 A | 3/2007 |
| JP | 2007-169506 A | 7/2007 |
| JP | 2007261206 | 10/2007 |
| WO | 2006/046759 A1 | 5/2006 |
| WO | 2007083848 | 7/2007 |

OTHER PUBLICATIONS

Final Office Action for U.S. Appl. No. 12/367,088 dated Sep. 29, 2011.

Non-Final Office Action for U.S. Appl. No. 12/367,088 dated Mar. 29, 2011.

* cited by examiner

AQUEOUS COLORANT DISPERSION, PRODUCTION METHOD OF AQUEOUS COLORANT DISPERSION, AND AQUEOUS INK FOR INKJET RECORDING

CROSS-REFERENCE TO RELATED APPLICATION

This application claims priority under 35 USC 119 from Japanese Patent Application Nos. 2008-049994 and 2008-216650, the disclosures of which are incorporated by reference herein.

BACKGROUND OF THE INVENTION

1. Field of the Invention

The present invention relates to an aqueous colorant dispersion with good dispersibility of colorant, a method for producing an aqueous colorant dispersion, and an aqueous ink for inkjet recording.

2. Description of the Related Art

In recent years, with the increase in demands for resource protection, environmental protection, and higher safety during operations, demands for water-based paints and inks (hereinafter may be collectively referred to as "ink") are increasing. Water-based paints and inks are, as is the case with oil-based paints and inks, required to have flowability, storage stability, glossiness of coatings, clarity, and coloring power. However, most pigments are not well dispersed in water-based vehicles in comparison with oil-based vehicles, and thus cannot provide satisfactory quality by an ordinary dispersion procedure. In order to solve this problem, the use of various additives such as dispersing resins for aqueous pigment dispersion and surfactants has been studied, but there is still no water-based paint or ink which satisfies all the above-described requirements and is comparable to known high quality oil-based paints or inks.

In order to solve the above problem, for example, an aqueous pigment ink containing a pigment dispersion capsulated with a polymer containing 20 to 70% by mass of aromatic rings is disclosed in, for example, U.S. Patent Publication No. 2005/0124726 A1.

In addition, a pigment ink for inkjet recording containing a pigment dispersion in which a random copolymer of a hydrophilic monomer and a hydrophobic monomer in an amount of 50 to 80% by weight with respect to the polymer weight is used as a dispersant is disclosed in, for example, U.S. Patent Publication No. 2006/0014855 A1.

However, in the U.S. Patent Publication No. 2005/0124726 A1, the content of the aromatic rings contained in the polymer for capsulating and dispersing the pigment is too high, so that the ink prepared by the technique disclosed therein cannot provide satisfactory properties of an aqueous ink, specifically redispersibility. In U.S. Patent Publication No. 2006/0014855 A1, the dispersant polymer is too hydrophilic, so that the ink prepared by the technique disclosed therein is too viscous, and insufficient in stability over time of the viscosity and dispersion particle diameter. In addition, when the aqueous inks prepared by the techniques disclosed in U.S. Patent Publication Nos. 2005/0124726 A1 and 2006/0014855 A1 are used as inkjet recording inks, they cannot provide satisfactory ejection stability.

SUMMARY OF THE INVENTION

According to an aspect of the invention, there is provided an aqueous colorant dispersion comprising a colorant (A), a polymer (B), and an aqueous liquid medium (I), wherein the polymer (B) is a copolymer including a hydrophilic structural unit and a hydrophobic structural unit, the content of the hydrophobic structural unit in the polymer (B) being more than 80% by mass but less than 100% by mass, the hydrophobic structural unit includes a hydrophobic structural unit (a) having an aromatic ring linked via a linking group to an atom included in the main chain of the polymer (B), the content of aromatic rings in the polymer (B) is 10% by mass or more but less than 20% by mass with respect to the mass of the polymer (B), the hydrophilic structural unit includes a hydrophilic structural unit (b) including an ionic group, and the polymer (B) includes a structural unit (c) different from the hydrophobic structural unit (a) and from the hydrophilic structural unit (b), the content of the structural unit (c) in the polymer (B) being more than 15% by mass but less than 90% by mass.

DETAILED DESCRIPTION OF THE INVENTION

Hereinafter, details of the invention are described.

The aqueous colorant dispersion of the invention comprises a colorant (A), a polymer (B), and an aqueous liquid medium (I), wherein the polymer (B) is a copolymer including a hydrophilic structural unit and a hydrophobic structural unit, the content of the hydrophobic structural unit in the polymer (B) being more than 80% by mass but less than 100% by mass, the hydrophobic structural unit includes a hydrophobic structural unit (a) having an aromatic ring linked via a linking group to an atom included in the main chain of the polymer (B), the content of aromatic rings in the polymer (B) is 10% by mass or more but less than 20% by mass with respect to the mass of the polymer (B), the hydrophilic structural unit includes a hydrophilic structural unit (b) including an ionic group, and the polymer (B) includes a structural unit (c) different from the hydrophobic structural unit (a) and from the hydrophilic structural unit (b), the content of the structural unit (c) in the polymer (B) being more than 15% by mass but less than 90% by mass.

The aqueous colorant dispersion of the invention having the above-described components is a dispersion which includes a finely dispersed colorant and is excellent in stability over time.

(Colorant (A))

The colorant (A) in the invention is further described below in detail.

The colorant in the invention may be freely selected from known dyes and pigments. In particular, from the viewpoint of ink coloring properties, the colorant is preferably substantially insoluble or poorly soluble in water. Specific examples of such colorant include various pigments, disperse dyes, oil-soluble dyes, and dyes forming J aggregates. Among them, from the viewpoint of light resistance, pigments are more preferable.

The pigment used in the invention may be freely and appropriately selected according to the intended use, and may be organic or inorganic pigment.

Examples of the organic pigment include azo pigments, polycyclic pigments, dye chelates, nitro pigments, nitroso pigments, and aniline black. Among them, azo pigments and polycyclic pigments are more preferable. Examples of the azo pigments include azo lakes, insoluble azo pigments, condensed azo pigments, and chelate azo pigments. Examples of the polycyclic pigment include phthalocyanine pigments, perylene pigments, perinone pigments, anthraquinone pigments, quinacridone pigments, dioxazine pigments, indigo pigments, thio indigo pigments, isoindolinone pigments, and quinophthalone pigments. Examples of the dye chelates include basic dye chelates and acidic dye chelates.

Examples of the inorganic pigment include titanium oxide, iron oxide, calcium carbonate, barium sulfate, aluminium hydroxide, barium yellow, cadmium red, chrome yellow, and carbon black. Among them, carbon black is particularly preferable. The carbon black may be produced by a known method such as a contact method, a furnace method, or a thermal method.

Specific examples of carbon black include, but not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, and RAVEN 700 (manufactured by Columbian Carbon Company), REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300, and MONARCH 1400 (manufactured by Cabot Corporation), COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (manufactured by Degussa), No. 25, No. 33, No. 40, No. 45, No. 47, No. 52, No. 900, No. 2200B, No. 2300, MCF-88, MA600, MA7, MA8, and MA100 (manufactured by Mitsubishi Chemical Corporation).

Of the organic pigment which may be used in the invention, examples of yellow ink pigments include C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180.

Examples of magenta ink pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (red oxide), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269, and C. I. Pigment Violet 19. Among them, C. I. Pigment Red 122 is particularly preferable.

Examples of cyan ink pigments include C. I. Pigment Blue 1, 2, 3, 15, 15:1, 15:2, 15:3, 15:34, 16, 17:1, 22, 25, 56, 60, C. I. Vat Blue 4, 60, and 63. Among them, C. I. Pigment Blue 15:3 is particularly preferable.

These pigments may be used alone or in combination of two or more thereof selected from one or more product groups described above.

From the viewpoints of ink coloring properties and storage stability, the content of the colorant in the aqueous colorant dispersion is preferably from 0.1 to 20% by mass, and more preferably from 0.2 to 15% by mass, and particularly preferably from 0.5 to 10% by mass with respect to the total solid mass of the dispersion.

[Polymer (B)]

The polymer (B) in the invention is described below in detail.

The polymer (B) is used as the dispersant for the colorant (A) in the aqueous liquid medium (I).

The polymer (B) has a structure composed of a hydrophobic structural unit and a hydrophilic structural unit.

The composition ratios of the hydrophilic and hydrophobic structural units depend on the degrees of hydrophilicity and hydrophobicity of the units. The content of the hydrophobic structural unit is more than 80% by mass, more preferably 85% by mass or more, and particularly preferably 87% by mass or more with respect to the total mass of the polymer (B). The content of the hydrophilic structural unit is less than 20% by mass. If the content of the hydrophilic structural unit is beyond the above limit, components dissolved in the aqueous medium (I) by themselves without contributing to the dispersion of the colorant are increased, which results in the deterioration of properties of the colorant (A), such as dispersibility.

The polymer (B) contains aromatic rings. The content of the aromatic rings is 10% by mass or more but less than 20% by mass, more preferably 12% by mass or more but less than 20% by mass, and particularly preferably 15% by mass or more but 19% by mass or less with respect to the mass of the polymer (B). If the content of the aromatic rings is 20% by mass or more, the resultant inkjet ink is insufficient in ejection properties (particularly ejection recovery characteristics), and if it is less than 10% by mass, the colorant (A) has deteriorated dispersibility and dispersion stability.

<Hydrophobic Structural Unit>

(Structural Unit (a) Containing an Aromatic Ring Linked Via a Linking Group to an Atom Included in the Main Chain)

The polymer (B) of the invention contains at least a hydrophobic structural unit (a) which contains an aromatic ring linked via a linking group to an atom included in the main chain of the polymer (B) (hereinafter may be referred to simply as "hydrophobic structural unit (a)") as a hydrophobic structural unit.

The phrase "via a linking group" means that the aromatic ring is linked via a linking group to an atom included in the main chain of the polymer. Due to such a structure, an appropriate distance is maintained between the hydrophilic structural unit and the hydrophobic aromatic ring in the polymer (B). As a result of this, the polymer (B) readily interacts with and is firmly adsorbed to the colorant (A), which results in the improvement of the dispersibility.

When the polymer (B) in the invention is a branched polymer such as a graft polymer, a comb polymer, or a star polymer, the atoms included in the so-called "side chain" or "branch polymer" of the graft polymer or comb polymer are also regarded as atoms included in the "main chain", and atoms included in the "arm polymer" of the star polymer are also regarded as atoms included in the "main chain".

The content of the hydrophobic structural unit (a) containing an aromatic ring linked via a linking group to an atom included in the main chain of the polymer (B) depends on the type of the aromatic ring. Within the above-described specified range of the aromatic ring content, the content of the hydrophobic structural unit (a) is preferably 25% by mass or more but less than 83% by mass, more preferably 30% by mass or more but less than 80% by mass, and particularly preferably 40% by mass or more but less than 75% by mass with respect to the total mass of the polymer (B).

In the invention, the aromatic ring in the hydrophobic structural unit (a) is preferably a substituted or unsubstituted benzene or naphthalene ring. Examples of preferable substituents include an alkyl group, an alkyloxy group, a halogen atom, a cyano group, and a nitro group. From the viewpoints of dispersibility of the colorant (A), availability, and versatility, the aromatic ring is particularly preferably an unsubstituted benzene ring.

The benzene ring in the hydrophobic structural unit (a) is preferably contained in the polymer (B) as shown by the following formula (1).

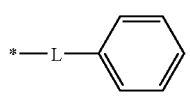

Formula (1)

In the formula (1), * represents the connecting point with the main chain of the polymer (B), L represents a divalent linking group having 1 to 30 carbon atoms, more preferably a linking group having 1 to 25 carbon atoms, and particularly preferably a linking group having 1 to 20 carbon atoms. The divalent linking group may be saturated or unsaturated, and may have a linear, branched, or ring structure, and may contain a heteroatom selected from O, N, and S.

As the hydrophobic structural unit (a) containing a benzene ring linked via a linking group to an atom included in the main chain of the polymer (B), the structure represented by the following formula (2) is particularly preferable.

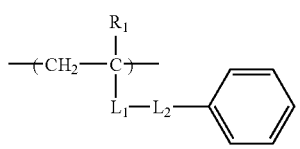

Formula (2)

In the formula (2), $R_1$ represents a hydrogen atom, a methyl group, or a halogen atom, $L_1$ represents —COO—, —OCO—, —CONR$_2$—, —O— (the left side of which is linked to the main chain), or a substituted or unsubstituted phenylene group, and $R_2$ represents a hydrogen atom or an alkyl group having 1 to 10 carbon atoms. $L_2$ represents a single bond or a divalent linking group having 1 to 30 carbon atoms, wherein the preferable range is the same as the above-described L. Examples of the substituent include, but not limited to, a halogen atom, an alkyl group, an alkoxy group, a hydroxyl group, and a cyano group.

In the formula (2), it is preferable that $R_1$ be a hydrogen atom or a methyl group, $L_1$ be —COO—, $L_2$ be a divalent linking group having 1 to 15 carbon atoms, and it is more preferable that $R_1$ be a hydrogen atom or a methyl group, $L_1$ be —COO—, $L_2$ be a divalent linking group containing an alkylene group having 1 to 12 carbon atoms or an oxyalkylene group. Examples of corresponding monomers include at least one selected from benzyl acrylate, benzyl methacrylate, phenoxyethyl acrylate, phenoxyethyl methacrylate, and oligoethylene glycol monophenyl ether acrylates and methacrylates (the number of repeating units is about 2 to 6). Among them, 2-phenoxyethyl acrylate or 2-phenoxyethyl methacrylate is most preferable.

When the structural unit represented by the formula (2) is derived from phenoxyethyl acrylate or phenoxyethyl methacrylate, the total content of the structural unit derived from phenoxyethyl acrylate and the structural unit derived from phenoxyethyl methacrylate is preferably 40% by mass or more but 53% by mass or less, more preferably 42% by mass or more but 53% by mass or less, and particularly preferably 45% by mass or more but 53% by mass or less in the polymer (B).

<Hydrophilic Structural Unit>

The hydrophilic structural unit in the polymer (B) in the invention is further described below.

The content of the hydrophilic structural unit may be 2% by mass or more but less than 20% by mass, preferably 5% by mass or more but 15% by mass or less, and more preferably 7% by mass or more but 13% by mass or less with respect to the total mass of the polymer (B).

The polymer (B) contains at least a hydrophilic structural unit (b) containing an ionic group (hereinafter may be referred to simply as "hydrophilic structural unit (b)") as a hydrophilic structural unit.

(Ionic Group-Containing Hydrophilic Structural Unit (b))

The content of the ionic group-containing hydrophilic structural unit (b) depends on whether the below-described structural unit (c) is hydrophilic and/or hydrophobic.

The polymer (B) in the invention contains a hydrophobic structural unit in an amount of more than 80% by mass, and a hydrophilic structural unit in an amount of less than 20% by mass. These contents depend on the hydrophobic structural unit (a), hydrophilic structural unit (b), and structural unit (c).

For example, when the polymer (B) consists of the hydrophobic structural unit (a), hydrophilic structural unit (b), and structural unit (c), if the structural unit (c) is hydrophilic, the content of the ionic group-containing hydrophilic structural unit (b) is calculated by "(total mass percentage of hydrophilic structural unit)–(mass percentage of structural unit (c))".

If the structural unit (c) is hydrophobic, the content of the ionic group-containing hydrophilic structural unit (b) is calculated by "100–(mass percentage of hydrophobic structural unit (a))–(mass percentage of structural unit (c))".

The ionic group-containing structural unit (b) may be obtained through polymerization of an ionic group-containing monomer, or introduction of an ionic group (anionic or cationic group) to the polymer chain after polymerization of a monomer containing no ionic group.

Examples of the ionic group include anionic groups such as a carboxyl group, a sulfonic acid group, and a phosphoric acid group, and cationic groups such as an amino group and an ammonium group. Among them, one or more anionic groups selected from a carboxyl group, a sulfonic acid group, and a phosphoric acid group is preferable.

Examples of the anionic group-containing and cationic group-containing monomers which may be used in the invention include, but not limited to, the followings.

Of anionic group-containing monomers, examples of those containing a carboxyl group include unsaturated carboxylic acid monomers such as acrylic acid, methacrylic acid, crotonic acid, itaconic acid, maleic acid, fumaric acid, and citraconic acid, β-carboxyethylacrylic acid, and 2-methacryloyloxymethylsuccinic acid. Examples of the sulfonic acid group-containing monomer include styrenesulfonic acid, 2-acrylamide-2-methylpropanesulfonic acid, 3-sulfopropyl (meth)acrylate, and bis-(3-sulfopropyl)itaconate. Examples of the phosphoric acid group-containing monomer include vinylphosphonic acid, vinyl phosphate, bis(methacryloxyethyl)phosphate, diphenyl-2-acryloyl oxyethyl phosphate, diphenyl-2-methacryloyloxy ethyl phosphate, and dibutyl-2-acryloyl oxyethyl phosphate.

Examples of the cationic group-containing monomer include at least one selected from the group consisting of tertiary amine-containing vinyl monomers and ammonium salt-containing vinyl monomers.

Examples of the tertiary amine-containing vinyl monomers include N,N-dimethylaminoethyl(meth)acrylate, N,N-dimethylaminopropyl(meth)acrylate, N,N-diethyl aminoethyl(meth)acrylate, N,N-dimethylaminopropyl(meth)acrylamide, vinylpyrrolidone, 2-vinylpyridine, 4-vinylpyridine, 2-methyl-6-vinylpyridine, and 5-ethyl-2-vinylpyridine.

Examples of the ammonium salt-containing monomer include quaternized N,N-dimethylaminoethyl(meth)acrylate, quaternized N,N-diethylaminoethyl(meth)acrylate, and quaternized N,N-dimethylaminopropyl(meth)acrylate.

Among them, anionic monomers are preferable, and, from the viewpoints of viscosity and ejection properties of the ink, unsaturated carboxylic acid monomers are preferable, and acrylic acid and methacrylic acid are particularly preferable. The ionic group-containing monomers may be used alone or in combination of two or more thereof.

When the polymer (B) in the invention contains an acidic group such as a carboxyl group, the acid value of the polymer (B) is preferably 10 mg KOH/g or more but less than 85 mg KOH/g, more preferably 30 mg KOH/g or more but less than 85 mg KOH/g, particularly preferably 50 mg KOH/g or more but less than 80 mg KOH/g, and most preferably 70 mg KOH/g or more but less than 80 mg KOH/g. The acid value is defined herein as the mass (mg) of KOH necessary for completely neutralizing 1 g of the polymer (B), and measured by the method described in Japanese Industrial Standard (JIS K0070, 1992), the disclosure of which is incorporated by reference herein.

When the acid value of the polymer (B) containing an acidic group such as carboxylic acid group is less than 10 mg KOH/g, the charge repulsion of the dispersion caused by dissociated carboxyl groups may be insufficient, which may result in the deterioration of the dispersibility. On the other hand, if the acid value is 85 mg KOH/g or more, the polymer may be so hydrophilic that it will not be adsorbed to the colorant but tends to dissolve in the aqueous medium.

<Structural Unit (c)>

The polymer (B) in the invention contains at least a structural unit (c), which has a structure different from those of the structural units (a) and (b) (hereinafter may be referred simply as "structural unit (c)").

Examples of the structural unit (c), which is different from the structural units (a) and (b), may be hydrophobic or hydrophilic, may include a single or two or more structural units, and may include both a hydrophilic structural unit and a hydrophobic structural unit, as long as its structure is different from those of the structural units (a) and (b).

The aqueous colorant dispersion of the invention exhibits good dispersibility owing to the polymer (B) including the structural unit (c). Details about the mechanism are unknown, but are considered as follows.

The polymer (B) contains mutually contradictory two structural units, the hydrophobic structural unit (a) which has affinity mainly with a colorant, and the hydrophilic structural unit (b) which has affinity mainly with an aqueous medium. If the polymer (B) consists of these structural units, the hydrophobic structural unit (a) and the hydrophilic structural unit (b) inhibit mutual actions, which results in insufficient dispersibility. When the polymer (B) further contains the structural unit (c) having intermediate properties between the hydrophobic structural unit (a) and the hydrophilic structural unit (b), the above problem is solved, and good dispersibility according to the invention is exhibited.

The content of the structural unit (c) in the polymer (B) is more than 15% by mass, more preferably more than 15% by mass but 50% by mass or less, even more preferably more than 20% by mass but 45% by mass or less, and particularly preferably 30% by mass or more but 40% by mass or less with respect to the total mass of the polymer (B).

When the structural unit (c) is hydrophobic, it may be formed through polymerization of a corresponding monomer, or introduction of a hydrophobic functional group to the polymer chain after polymerization.

The monomer for forming the hydrophobic structural unit (c) is not particularly limited as long as it contains a polymerizable functional group and a hydrophobic functional group, and may be selected from any known monomers.

From the viewpoints of availability, handleability, and versatility, the monomer for forming the hydrophobic structural unit is preferably selected from vinyl monomers (for example, (meth)acrylates, (meth)acrylamides, styrenes, and vinyl esters).

Examples of the (meth)acrylates include alkyl(meth)acrylates such as methyl(meth)acrylate, ethyl(meth)acrylate, (iso)propyl(meth)acrylate, (iso- or t-)butyl(meth)acrylate, 2-ethylhexyl(meth)acrylate, (iso)octyl(meth)acrylate, (iso)decyl(meth)acrylate, and (iso)stearyl(meth)acrylate. Among them, C1 to C6 alkyl(meth)acrylates are preferable, and C1 to C4 alkyl(meth)acrylates are more preferable.

Examples of the (meth)acrylamides include N-methyl(meth)acrylamide, N-ethyl(meth)acrylamide, N-propyl(meth)acrylamide, N-isopropyl(meth)acrylamide, N-n-butyl acryl(meth)amide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, vinyl(meth)acrylamide, N,N-diallyl(meth)acrylamide, and N-allyl(meth)acrylamide. Among them, (meth)acrylamide and N,N-dimethyl(meth)acrylamide are preferable.

Examples of the styrenes include styrene, methylstyrene, dimethylstyrene, trimethylstyrene, ethylstyrene, isopropylstyrene, N-butylstyrene, tert-butylstyrene, methoxystyrene, butoxystyrene, acetoxystyrene, chlorostyrene, dichlorostyrene, bromostyrene, chloromethylstyrene, hydroxystyrene protected with a group removable with an acidic substance (for example, t-Boc), methyl vinyl benzoate, α-methylstyrene, and vinylnaphthalene. Among them, styrene and α-methylstyrene are preferable.

Examples of the vinyl esters include vinyl acetate, vinyl chloroacetate, vinyl propionate, vinyl butylate, vinyl methoxy acetate, and vinyl benzoate. Among them, vinyl acetate is preferable.

When the structural unit (c) is hydrophobic, it is preferably a structural unit derived from a C1 to C6 alkyl(meth)acrylate, and particularly preferably a structural unit derived from a C1 to C4 alkyl(meth)acrylate. The structural unit (c) is most preferably a structural unit derived from methyl acrylate, methyl methacrylate, ethyl acrylate, or ethyl methacrylate.

When the structural unit (c) is hydrophilic, the structural unit (c) preferably contains a nonionic hydrophilic group. The structural unit (c) may be formed through polymerization of a corresponding monomer, or introduction of a hydrophilic functional group to the polymer chain after polymerization.

The monomer for forming the structural unit (c) is not particularly limited as long as it contains a polymerizable functional group and a nonionic hydrophilic functional group, and may be selected from any known monomers. From the viewpoints of availability, handleability, and versatility, vinyl monomers are preferable.

Examples of the vinyl monomers include (meth)acrylates, (meth)acrylamides, and vinyl esters containing a hydrophilic functional group. Examples of the hydrophilic functional group include a hydroxy group, an amide group (its nitrogen atom is unsubstituted), and the below-described alkylene oxide polymers such as polyethylene oxide and polypropylene oxide. Among them, hydroxyethyl(meth)acrylate, hydroxybutyl(meth)acrylate, (meth)acrylamide, and (meth) acrylates containing an alkylene oxide polymer are particularly preferable.

The structural unit (c) preferably includes a hydrophilic structural unit having an alkylene oxide polymer structure.

From the viewpoint of hydrophilicity and hydrophobicity, the alkylene of the alkylene oxide polymer has preferably from 1 to 6 carbon atoms, more preferably from 2 to 6 carbon atoms, and particularly preferably from 2 to 4 carbon atoms.

The degree of polymerization of the alkylene oxide polymer is preferably from 1 to 120, more preferably from 1 to 60, and particularly preferably from 1 to 30.

It is also preferable that the structural unit (c) be a hydrophilic structural unit containing a hydroxyl group.

The number of the hydroxyl group in the structural unit (c) is not particularly limited, and preferably from 1 to 4, more preferably from 1 to 3, and particularly preferably from 1 to 2, from the viewpoints of hydrophilicity and hydrophobicity of the polymer (B), and compatibility with the solvent or other monomers during polymerization.

The polymer (B) in the invention may be a random copolymer or a block copolymer wherein the structural units are arranged randomly or regularly. When the polymer (B) is a block copolymer, the order of the introduction of the structural units is arbitrary, and the copolymer may contain two or more blocks of identical components. From the viewpoints of versatility and manufacturability, a random copolymer is preferable.

The weight average molecular weight (Mw) of the polymer (B) used in the invention is preferably from 1000 to 1000000, more preferably from 2000 to 200000, and even more preferably from 2000 to 60000.

The molecular weight within the above-described range is preferable from the viewpoint that the polymer (B) exhibits good steric repulsion effect of a dispersant, and the steric effect reduces the time necessary for the adsorption to a colorant.

The molecular weight distribution (weight average molecular weight/number average molecular weight) of the polymer used in the invention is preferably from 1 to 6, and more preferably from 1 to 4.

The molecular weight distribution within the above-described range is preferable from the viewpoint that the time necessary for the dispersion of the pigment is reduced, and the stability over time of the dispersion is improved. The number average molecular weight and weight average molecular weight are determined by the differential refractometer detection with THF as a solvent in a GPC analyzer using columns of TSK Gel GMHxL, TSK Gel G4000 HxL, and TSK Gel G2000HxL (trade names, all are manufactured by Tosoh Corporation). For the conversion, polystyrene was used as the reference material.

The polymer used in the invention may be synthesized by various polymerization method, for example, solution polymerization, precipitation polymerization, suspension polymerization, precipitate polymerization, bulk polymerization, or emulsion polymerization. The polymerization reaction may be carried out under a known system, such as a batch, semi-continuous, or continuous system.

Initiation of the polymerization may be carried out with a radical initiator, or photoirradiation or irradiation. These methods of polymerization and initiation of polymerization are described in, for example, "Kobunshi Gosei Hoho" by Teiji Turuta, Revised Edition (published by Nikkan Kogyo Shimbun, Ltd., 1971) and "Kobunshi Gosei no Jikkenho" by Takayuki Ohtu and Masaetu Kinoshita (published by Kagaku-Dojin Publishing Co., Inc., 1972) pp. 124 to 154.

Among these polymerization methods, a solution polymerization method using a radical initiator is preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used alone or in combination of two or more thereof, or may be mixed with water.

The polymerization temperature is chosen in consideration of the molecular weight of the intended polymer and the type of the initiator. The polymerization temperature is usually from 0° C. to 100° C., and is preferably from 50 to 100° C.

The reaction pressure may be appropriately selected, and is usually from 1 to 100 kg/cm$^2$, and particularly preferably from 1 to 30 kg/cm$^2$. The reaction period may be about 5 to 30 hours. The resultant resin may be subjected to purification treatment such as reprecipitation.

Specific examples of preferable polymer (B) in the invention are shown below. The invention is not limited to these examples.

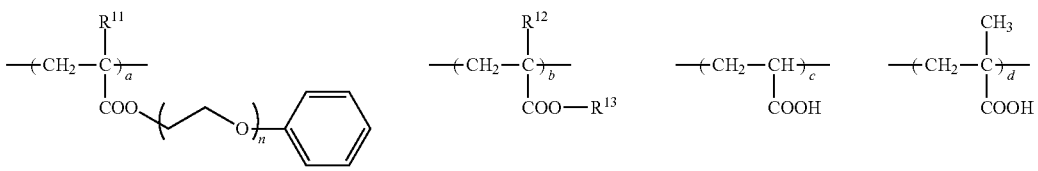

a, b, c, and d each represent the mass ratio, and n represents the number of repeating units.

| | $R^{11}$ | $R^{12}$ | $R^{13}$ | n | a | b | c | d | Mw | Mw/Mn | Acid value [mgKOH/g] | Aromatic ring content [wt %] |
|---|---|---|---|---|---|---|---|---|---|---|---|---|
| B-1 | —CH$_3$ | —CH$_3$ | —CH$_3$ | 1 | 50 | 38 | 0 | 12 | 42000 | 2.43 | 78.3 | 18.9 |
| B-2 | —CH$_3$ | —CH$_3$ | —CH$_3$ | 1 | 45 | 45 | 0 | 10 | 43000 | 2.34 | 65.1 | 17.0 |
| B-3 | H | —CH$_3$ | —CH$_3$ | 1 | 45 | 45 | 0 | 10 | 44500 | 2.84 | 65.2 | 18.3 |
| B-4 | H | H | —C$_2$H$_5$ | 1 | 45 | 45 | 10 | 0 | 48000 | 2.64 | 78.1 | 18.3 |
| B-5 | —CH$_3$ | —CH$_3$ | —CH$_3$ | 1 | 50 | 40 | 5 | 5 | 38900 | 2.24 | 71.5 | 18.9 |
| B-6 | —CH$_3$ | —CH$_3$ | —CH$_3$ | 1 | 50 | 40 | 10 | 0 | 50100 | 2.55 | 78.0 | 18.9 |
| B-7 | —CH$_3$ | —CH$_3$ | —C$_2$H$_5$ | 1 | 48 | 42 | 0 | 10 | 48000 | 2.35 | 65.0 | 18.2 |
| B-8 | H | H | —C$_2$H$_5$ | 2 | 55 | 35 | 10 | 0 | 45000 | 2.21 | 77.8 | 18.2 |

-continued

| | | | | | | | | | | | | |
|---|---|---|---|---|---|---|---|---|---|---|---|---|
| B-9 | H | —CH₃ | —CH₃ | 2 | 50 | 40 | 0 | 10 | 45300 | 2.34 | 65.3 | 16.5 |
| B-10 | H | —CH₃ | —C₂H₅ | 2 | 45 | 43 | 0 | 12 | 43900 | 2.50 | 78.2 | 14.9 |
| B-11 | H | —CH₃ | —CH(CH₃)₂ | 2 | 50 | 40 | 5 | 5 | 39800 | 2.21 | 71.6 | 16.5 |
| B-12 | —CH₃ | —CH₃ | —C₂H₅ | 2 | 60 | 28 | 0 | 12 | 51000 | 2.20 | 78.4 | 18.7 |
| B-13 | H | H | —C₂H₅ | 4 | 72 | 16 | 0 | 12 | 54000 | 2.63 | 78.3 | 17.3 |
| B-14 | H | —CH₃ | —CH₃ | 4 | 50 | 40 | 10 | 0 | 39000 | 2.30 | 77.7 | 12.0 |
| B-15 | H | —CH₃ | —CH₃ | 4 | 60 | 30 | 5 | 5 | 40000 | 2.41 | 71.5 | 14.4 |
| B-16 | —CH₃ | —CH₃ | —C₂H₅ | 4 | 65 | 25 | 0 | 10 | 40200 | 2.22 | 65.4 | 15.0 |
| B-17 | H | H | —CH₂CH(CH₃)CH₃ | 5 | 70 | 20 | 0 | 10 | 48500 | 2.43 | 65.3 | 14.9 |
| B-18 | H | H | —C₂H₅ | 5 | 74 | 16 | 10 | 0 | 47700 | 2.67 | 77.9 | 15.7 |
| B-19 | H | —CH₃ | —CH₃ | 5 | 60 | 30 | 5 | 5 | 44900 | 2.45 | 71.3 | 12.7 |
| B-20 | —CH₃ | —CH₃ | —C₂H₅ | 5 | 70 | 18 | 0 | 12 | 50100 | 2.35 | 78.1 | 14.3 |
| B-21 | H | H | —C(CH₃)₃ | 6 | 65 | 25 | 0 | 10 | 55000 | 2.21 | 65.5 | 12.3 |
| B-22 | H | —CH₃ | —CH₃ | 6 | 55 | 35 | 5 | 5 | 49000 | 2.45 | 71.4 | 10.4 |
| B-23 | H | H | —C₂H₅ | 6 | 74 | 16 | 10 | 0 | 48700 | 2.35 | 77.6 | 14.0 |
| B-24 | —CH₃ | —CH₃ | —CH₃ | 6 | 72 | 16 | 0 | 12 | 50000 | 2.55 | 78.2 | 13.2 |

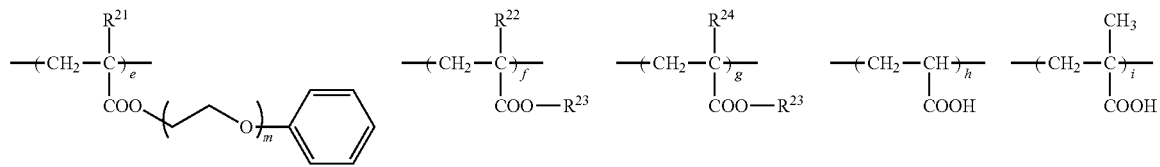

e, f, g, h and i each represent the mass ratio, and m represents the number of repeating units.

| | $R^{21}$ | $R^{22}$ | $R^{23}$ | $R^{24}$ | $R^{25}$ | m | e | f | g | h | i | Mw | Mw/Mn | Acid value [mgKOH/g] | Aromatic ring content [wt %] |
|---|---|---|---|---|---|---|---|---|---|---|---|---|---|---|---|
| B-25 | —CH₃ | —CH₃ | —CH₃ | —CH₃ | —CH₂CH₂—OH | 1 | 50 | 37 | 3 | 0 | 10 | 39800 | 2.21 | 65.1 | 18.9 |
| B-26 | —CH₃ | —CH₃ | —C₂H₅ | H | (CH₂CH₂O)₉—H | 1 | 50 | 35 | 5 | 5 | 5 | 42000 | 2.42 | 71.6 | 18.9 |
| B-27 | H | H | —CH₃ | —CH₃ | (CH₂CH₂O)₂₃—CH₃ | 1 | 45 | 41 | 4 | 10 | 0 | 40300 | 2.21 | 77.8 | 18.3 |
| B-28 | H | H | —C₂H₅ | H | —CH₂CH₂—OH | 2 | 60 | 27 | 3 | 10 | 0 | 50000 | 2.22 | 78.1 | 18.7 |
| B-29 | H | —CH₃ | —CH₃ | —CH₃ | (CH₂CH₂O)₈—H | 2 | 55 | 28 | 5 | 0 | 12 | 38000 | 2.34 | 78.0 | 17.2 |
| B-30 | H | H | —CH(CH₃)₂ | —CH₃ | (CH₂CH₂O)₄—CH₃ | 4 | 70 | 15 | 5 | 5 | 5 | 43900 | 2.45 | 71.1 | 16.2 |
| B-31 | H | —CH₃ | —C₂H₅ | —CH₃ | (CH₂CH₂O)₉—H | 4 | 74 | 13 | 3 | 10 | 0 | 42700 | 2.34 | 78.1 | 17.1 |
| B-32 | H | H | —C₂H₅ | H | (CH₂CH₂O)₂₃—CH₃ | 6 | 70 | 15 | 3 | 0 | 12 | 47500 | 2.18 | 78.5 | 12.8 |
| B-33 | H | —CH₃ | —CH₃ | —CH₃ | (CH₂CH₂O)₉—CH₃ | 6 | 65 | 20 | 3 | 0 | 12 | 44000 | 2.25 | 78.3 | 11.9 |

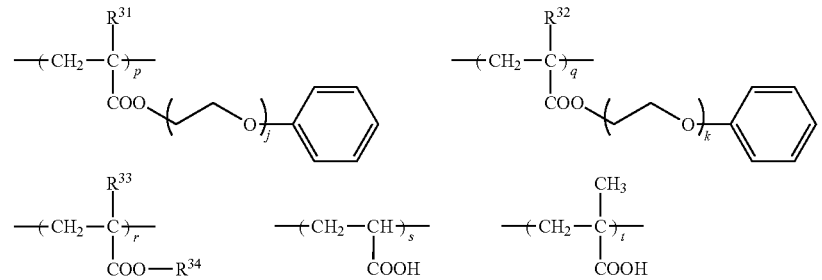

p, q, r, s, and t each represent the mass ratio, and j and k each represent the number of repeating units.

| | $R^{31}$ | $R^{32}$ | $R^{33}$ | $R^{34}$ | j | k | p | q | r | s | t | Mw | Mw/Mn | Acid value [mgKOH/g] | Aromatic ring content [wt %] |
|---|---|---|---|---|---|---|---|---|---|---|---|---|---|---|---|
| B-34 | —CH₃ | H | —CH₃ | —CH₃ | 1 | 2 | 45 | 5 | 40 | 0 | 10 | 42300 | 2.54 | 78.3 | 18.7 |
| B-35 | —CH₃ | H | —CH₃ | —CH₂CH(CH₃)CH₃ | 1 | 4 | 45 | 5 | 40 | 5 | 5 | 44900 | 2.34 | 72.0 | 18.2 |
| B-36 | H | H | H | —C₂H₅ | 1 | 4 | 40 | 10 | 40 | 10 | 0 | 50200 | 2.33 | 78.1 | 18.7 |
| B-37 | H | H | H | —C₂H₅ | 1 | 5 | 40 | 10 | 40 | 0 | 10 | 43900 | 2.40 | 65.2 | 18.4 |
| B-38 | —CH₃ | H | —CH₃ | —CH₃ | 1 | 5 | 45 | 10 | 33 | 0 | 12 | 44800 | 2.89 | 78.4 | 19.2 |
| B-39 | H | H | H | —C₂H₅ | 1 | 6 | 40 | 10 | 40 | 10 | 0 | 55100 | 2.21 | 65.5 | 18.2 |
| B-40 | H | H | —CH₃ | —CH₃ | 1 | 6 | 45 | 5 | 40 | 5 | 5 | 34900 | 2.54 | 72.0 | 19.2 |
| B-41 | H | H | H | —C₂H₅ | 2 | 6 | 40 | 20 | 28 | 0 | 12 | 49800 | 2.34 | 78.0 | 17.0 |
| B-42 | H | H | —CH₃ | —C(CH₃)₃ | 4 | 6 | 50 | 20 | 20 | 0 | 10 | 50000 | 2.41 | 65.4 | 15.8 |

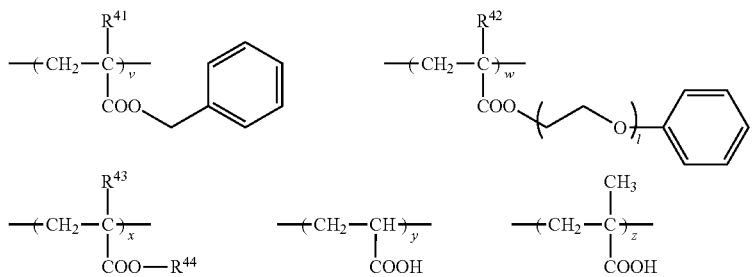

v, w, x, y, and z each represent the mass ratio, and I represents the number of repeating units.

| | R⁴¹ | R⁴² | R⁴³ | R⁴⁴ | l | v | w | x | y | z | Mw | Mw/Mn | Acid value [mgKOH/g] | Aromatic ring content [wt %] |
|---|---|---|---|---|---|---|---|---|---|---|---|---|---|---|
| B-43 | —CH₃ | — | —CH₃ | —CH₃ | — | 42 | 0 | 46 | 0 | 12 | 40000 | 2.24 | 78.3 | 18.6 |
| B-44 | —CH₃ | —CH₃ | —CH₃ | —C₂H₅ | 1 | 40 | 5 | 45 | 0 | 10 | 45300 | 2.54 | 65.1 | 19.6 |
| B-45 | —CH₃ | H | H | —CH₂CH(CH₃)CH₃ | 1 | 20 | 25 | 45 | 10 | 0 | 41900 | 2.34 | 77.7 | 19.0 |
| B-46 | —CH₃ | H | H | —C₂H₅ | 2 | 30 | 15 | 45 | 5 | 5 | 44300 | 2.15 | 71.9 | 18.3 |
| B-47 | H | H | H | —CH₃ | 4 | 30 | 20 | 40 | 10 | 0 | 50200 | 2.65 | 77.9 | 19.3 |
| B-48 | H | H | —CH₃ | —C₂H₅ | 5 | 35 | 5 | 48 | 0 | 12 | 40500 | 2.33 | 78.1 | 17.9 |
| B-49 | —CH₃ | H | —CH₃ | —CH₃ | 6 | 40 | 5 | 45 | 5 | 5 | 44000 | 2.41 | 71.6 | 18.7 |
| B-50 | —CH₃ | H | —CH₃ | —C₂H₅ | 6 | 40 | 10 | 40 | 0 | 10 | 50000 | 2.54 | 65.2 | 19.6 |

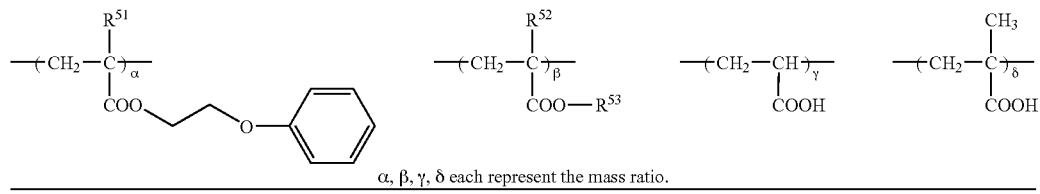

α, β, γ, δ each represent the mass ratio.

| | R⁵¹ | R⁵² | R⁵³ | α | β | γ | δ | Mw | Mw/Mn | Acid value [mgKOH/g] | Aromatic ring content [wt %] |
|---|---|---|---|---|---|---|---|---|---|---|---|
| B-51 | —CH₃ | —CH₃ | —CH₃ | 50 | 39 | 0 | 11 | 40000 | 2.38 | 71.8 | 18.9 |
| B-52 | —CH₃ | —CH₃ | —CH₃ | 48 | 41 | 0 | 11 | 54000 | 2.22 | 72.0 | 18.2 |
| B-53 | —CH₃ | —CH₃ | —CH₃ | 50 | 37.8 | 0 | 12.2 | 45000 | 2.35 | 79.5 | 18.9 |
| B-54 | —CH₃ | —CH₃ | —CH₃ | 51 | 38 | 0 | 11 | 45000 | 2.35 | 71.6 | 19.3 |
| B-55 | —CH₃ | —CH₃ | —CH₃ | 52.5 | 36.5 | 0 | 11 | 40200 | 2.29 | 71.5 | 19.9 |
| B-56 | —CH₃ | —CH₃ | —CH₃ | 50 | 37 | 0 | 13 | 44500 | 2.33 | 84.7 | 18.9 |
| B-57 | —CH₃ | —CH₃ | —C₂H₅ | 48 | 41 | 0 | 11 | 46000 | 2.65 | 71.5 | 18.1 |
| B-58 | —CH₃ | —CH₃ | —C₂H₅ | 40 | 50 | 0 | 10 | 47500 | 2.48 | 65.5 | 15.1 |
| B-59 | —CH₃ | —CH₃ | —C₂H₅ | 38 | 51 | 0 | 11 | 39600 | 2.38 | 71.2 | 14.4 |
| B-60 | H | H | —CH₃ | 47 | 43 | 10 | 0 | 48600 | 2.64 | 77.6 | 19.1 |
| B-61 | H | H | —CH₃ | 49 | 41 | 10 | 0 | 50400 | 2.66 | 78.0 | 19.9 |
| B-62 | H | H | —CH₃ | 40 | 51 | 9 | 0 | 44100 | 2.42 | 70.2 | 16.3 |
| B-63 | H | H | —CH₃ | 43 | 46.7 | 10.3 | 0 | 48500 | 2.55 | 80.6 | 17.5 |
| B-64 | H | H | —C₂H₅ | 48 | 42 | 10 | 0 | 54200 | 2.63 | 77.0 | 19.5 |
| B-65 | H | H | —C₂H₅ | 40 | 52 | 8 | 0 | 46300 | 2.54 | 62.5 | 16.3 |
| B-66 | H | H | —CH₃ | 42 | 49 | 9 | 0 | 47800 | 2.51 | 70.5 | 17.1 |
| B-67 | H | H | —C₂H₅ | 47 | 43 | 10 | 0 | 41900 | 2.40 | 77.5 | 19.1 |

(Aqueous Liquid Medium (I))

The aqueous liquid medium in the aqueous colorant dispersion of the invention contains water, and may further contain a water-soluble organic solvent. The water-soluble organic solvent serves as an anti-drying agent, a humectant, or a penetration enhancing agent.

The anti-drying agent is used for preventing clogging of inkjet nozzles caused by drying of the inkjet ink containing the aqueous colorant dispersion at the nozzle injection ports. The anti-drying agent or humectant is preferably a water-soluble organic solvent having a lower vapor pressure than water.

The penetration enhancing agent is preferably a water-soluble organic solvent thereby promoting the penetration of the inkjet ink into paper.

Examples of the water-soluble organic solvent include: alkanediols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropyleneglycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides such as glucose, mannose, fructose, ribose, xylose, arabinose, galactose, aldonic acid, glucitol, maltose, cellobiose, lactose, sucrose, trehalose, and maltotriose; sugar alcohols; hyaluronic acids; so-called solid humectants such as ureas; alkyl alcohols having 1 to 4 carbon atoms, such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetin, diacetin, triacetin, and sulfolane. These organic solvents may be used alone or in combination of two or more thereof.

As an anti-drying agent or a humectant, polyhydric alcohols are useful. Examples of the polyhydric alcohols include glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, and 1,2,6-hexanetriol. These polyhydric alcohols may be used alone or in combination of two or more thereof.

As a penetrating agent, polyol compounds are preferable. Examples of aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. Among them, 2-ethyl-1,3-hexanediol and 2,2,4-trimethyl-1,3-pentanediol are preferable.

The water-soluble solvent used in the invention may be used alone or in combination of two or more thereof. The content of the water-soluble organic solvent is 1% by mass or more but 60% by mass or less, and preferably 5% by mass or more but 40% by mass or less.

The addition amount of water used in the invention is not particularly limited, preferably 10% by mass or more but 99% by mass or less, more preferably 30% by mass or more but 80% by mass or less, and even more preferably 50% by mass or more but 70% by mass or less.

The content of the aqueous liquid medium in the aqueous colorant dispersion of the invention is preferably from 1 to 70% by mass, more preferably from 2 to 60% by mass, and particularly preferably from 5 to 50% by mass, from the viewpoints of anti-drying properties, permeability through the adherend, and liquid properties such as viscosity.

When the content of the aqueous liquid medium is within the above-described range, the liquid properties of the aqueous colorant dispersion, such as drying speed, permeability through the adherend, and viscosity are adjusted in appropriate states.

In order to improve the fixing properties and abrasion resistance of printed materials, the aqueous colorant dispersion of the invention may further contain resin fine particles or a latex. Examples of the resin fine particles or polymer latex which may be used in the invention include those composed of acrylic resins, vinyl acetate-based resins, styrene-butadiene-based resins, vinyl chloride-based resins, acryl-styrene-based resins, butadiene resins, styrenic resins, crosslinked acrylic resins, crosslinked styrenic resins, benzoguanamine resins, phenolic resins, silicone resins, epoxy resins, urethane-based resins, paraffin-based resins, fluorine-based resins or latex thereof. Among them, acrylic resins, acryl-styrene-based resins, styrenic resins, crosslinked acrylic resins, and crosslinked styrenic resins are preferable.

The weight average molecular weight of the resin fine particles is preferably 10000 or more but 200000 or less, and more preferably 100000 or more but 200000 or less.

The average particle diameter of the resin fine particle is preferably from 10 nm to 1 µm, more preferably from 10 to 200 nm, even more preferably from 20 to 100 nm, and particularly preferably from 20 to 50 nm.

The addition amount of the resin fine particles is preferably from 0.5 to 20% by mass, more preferably from 3 to 20% by mass, and even more preferably from 5 to 15% by mass with respect to the ink.

The glass transition temperature (Tg) of the resin fine particles is preferably 30° C. or higher, more preferably 40° C. or higher, and even more preferably 50° C. or higher.

The resin fine particles are not particularly limited as to their particle diameter distribution, and may have a broad particle diameter distribution or a monodispersed particle diameter distribution. Alternatively, a mixture of two or more kinds of resin fine particles each having a monodispersed particle diameter distribution may be used.

The aqueous colorant dispersion of the invention may contain, in addition to the above-described components, as necessary, other additives. Examples of the other additives include known additives such as an ultraviolet absorber, an anti-fading agent, a fungicide, a pH controlling agent, a rust preventive, an antioxidant, an emulsification stabilizer, a preservative, an anti-foaming agent, a viscosity regulator, a dispersion stabilizer, a chelating agent, and a surface tension regulator.

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

The anti-fading agent may be selected from various organic and metal complex-based anti-fading agent. Examples of the organic anti-fading agents include hydroquinones, alkoxy phenols, dialkoxy phenols, phenols, anilines, amines, indans, chromanes, alkoxy anilines, and heterocycles. Examples of the metal complexes include nickel complexes and zinc complexes.

Examples of the fungicide include sodium dehydroacetate, sodium benzoate, sodium pyridinethione-1-oxide, p-hydroxybenzoic acid ethyl ester, 1,2-benzisothiazoline-3-one, sodium sorbate, and sodium pentachlorophenol. The content of the fungicide in an ink is preferably from 0.02 to 1.00% by mass.

The pH controlling agent is not particularly limited as long as it adjusts the pH to an intended value without adversely affecting the recording ink to be prepared, and may be appropriately selected according to the intended use. Examples of such pH controlling agent include alcohol amines (for example, diethanolamine, triethanolamine, 2-amino-2-ethyl-1,3-propanediol), alkali metal hydroxides (for example, lithium hydroxide, sodium hydroxide, potassium hydroxide), ammonium hydroxide (for example, ammonium hydroxide, quaternary ammonium hydroxide), phosphonium hydroxides, and alkali metal carbonates.

Examples of the rust preventive include acidic sulfites, sodium thiosulfate, ammon thioglycolate, diisopropyl-ammonium nitrite, pentaerythritol tetranitrate, and dicyclohexylammonium nitrite.

Examples of the antioxidant include phenol-based antioxidants (including hindered phenol-based antioxidants), amine-based antioxidants, sulfur-based antioxidants, and phosphor-based antioxidants.

Examples of the chelating agent include sodium ethylenediamine tetraacetate, sodium nitrilotriacetate, sodium hydroxyethyl-ethylnediamine triacetate, sodium diethylenetriamine pentaacetate, and sodium uramil diacetate.

Examples of the surface tension regulator include nonionic, cationic, anionic, and betainic surfactants. In order to achieve good ink jetting, the surface tension regulator is preferably used in an amount such that the ink of the invention has a surface tension of 20 to 60 mN/m, more preferably from 20 to 45 mN/m, and even more preferably from 25 to 40 mN/m.

Examples of effective surfactants include compounds containing hydrophilic and hydrophobic moieties within one molecule thereof. The surfactant may be anionic, cationic, ampholytic, or nonionic. The above-described polymer substance (polymer dispersant) is also usable as a surfactant.

Specific examples of the anionic surfactants include sodium dodecylbenzene sulfonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctyl sulfosuccinate, polyoxyethylene alkyl ether sodium sulfate, polyoxyethylene alkyl ether sodium sulfate, polyoxyethylene alkyl phenyl ether sodium sulfate, sodium dialkyl sulfosuccinate, sodium stearate, sodium oleate, and sodium t-octylphenoxy ethoxypolyethoxyethyl sulfate. These anionic surfactants may be used alone or in combination of two or more thereof.

Specific examples of the nonionic surfactants include poly(oxyethylene)lauryl ether, poly(oxyethylene)octylphenyl ether, poly(oxyethylene)oleylphenyl ether, poly(oxyethylene)nonylphenyl ether, oxyethylene-oxypropylene block copolymer, t-octylphenoxyethylpolyethoxyethanol, and nonylphenoxyethylpolyethoxyethanol. These nonionic surfactants may be used alone or in combination of two or more thereof.

Examples of the cationic surfactants include tetraalkyl ammonium salts, alkylamine salts, benzalkonium salts, alkylpyridium salts, and imidazolium salts, and specific examples thereof include dihydroxyethylstearylamine, 2-heptadecenyl-hydroxyethylimidazoline, lauryldimethylbenzylammonium chloride, cetylpyridinium chloride, and stearamidomethylpyridinium chloride.

The content of the surfactant in the aqueous colorant dispersion is not particularly limited, and is preferably 1% by mass or more, more preferably from 1 to 10% by mass, and even more preferably from 1 to 3% by mass.

When the aqueous colorant dispersion is applied by an inkjet method, from the viewpoints of ejection stability and the rate of aggregation, the viscosity of the aqueous colorant dispersion is preferably from 1 to 30 mPa·s, more preferably from 1 to 20 mPa·s, and particularly preferably from 2.5 to 15 mPa·s. The viscosity is measured at 25° C.

The viscosity of the aqueous colorant dispersion may be measured using, for example, an E type viscometer.

(Production Method of Aqueous Colorant Dispersion)

The method of the invention for producing an aqueous colorant dispersion includes mixing a mixture (II) containing a colorant (A), a polymer (B), and an organic solvent (C) capable of dissolving or dispersing the polymer (B), with an aqueous solution (III) containing a basic substance (mixing and hydration step), and then removing the organic solvent (C) therefrom (solvent removal step).

According to the method of the invention for producing an aqueous colorant dispersion, the colorant is finely dispersed, and thus an aqueous colorant dispersion having good storage stability is produced.

The organic solvent (C) in the invention is capable of dissolving or dispersing the polymer (B) in the invention. In addition, the organic solvent (C) preferably has some affinity for water. Specifically, the solubility of the organic solvent (C) in water at 20° C. is preferably 10% by mass or more but 50% by mass or less.

The aqueous colorant dispersion of the invention may be produced by a production method including the following steps (1) and (2). However, the invention is not limited to the method.

Step (1): dispersing of a mixture containing a colorant (A), a polymer (B), an organic solvent (C) capable of dissolving or dispersing the polymer (B), an aqueous solution (III) containing a basic substance, and water; and Step (2): removal of the organic solvent (C).

In the step (1), firstly, the polymer (B) is dissolved or dispersed in the organic solvent (C) to obtain their mixture (II) (mixing step).

secondly, the colorant (A), the aqueous solution (III) containing a basic substance, water, and as necessary a surfactant or other additives are added to the mixture (II), and mixed and dispersed to obtain an oil-in-water type aqueous colorant dispersion.

The degree of neutralization is not particularly limited. In usual cases, for example, the final aqueous colorant dispersion preferably has a pH of 4.5 to 10. The pH may be selected according to the desirable degree of neutralization of the water-insoluble vinyl polymer.

The colorant (A), polymer (B), and other additives used in the production method of aqueous colorant dispersion are the same as those mentioned above in the section of the aqueous colorant dispersion, and preferable examples thereof are also the same.

Preferable examples of the organic solvent (C) used in the invention include alcohol-based solvents, ketone-based solvents, and ether-based solvents. Among them, examples of the alcohol-based solvents include ethanol, isopropanol, n-butanol, tertiary butanol, isobutanol, and diacetone alcohol. Examples of the ketone-based solvent include acetone, methyl ethyl ketone, diethyl ketone, and methyl isobutyl ketone. Examples of the ether-based solvents include dibutyl ether, tetrahydrofuran, and dioxane. Among these solvents, isopropanol, acetone, and methyl ethyl ketone are preferable, and methyl ethyl ketone is particularly preferable.

These organic solvents (C) may be used alone or in combination of two or more thereof.

In the production of the aqueous colorant dispersion, kneading and dispersing treatment may be carried out by strong shearing force applied using, for example, a double roll, a triple roll, a ball mill, a tron mill, a disperser, a kneader, a cokneader, a homogenizer, a blender, a monoaxis or biaxial extruder.

Details about the kneading and dispersing treatment are described in, for example, "Paint Flow and Pigment Dispersion" by T. C. Patton, (1964, Published by John Wiley and Sons).

As necessary, the dispersion is finely dispersed together with beads made of glass or zirconia having a particle diameter of 0.01 to 1 mm, using a vertical or horizontal sand grinder, a pin mill, a slit mill or an ultrasound dispersing machine.

In the method of the invention for producing an aqueous colorant dispersion, the method for removing the organic solvent is not particularly limited, and may use a known method such as vacuum distillation.

The average particle diameter of the colorant obtained by the method of the invention for producing an aqueous colorant dispersion is preferably 10 nm or more but less than 200 nm, more preferably 50 nm or more but less than 130 nm, and even more preferably 60 nm or more but less than 100 nm. When the average particle diameter is within the above range, good color developability, dispersion stability, and ejection stability during jetting are provided.

The average particle diameter of the dispersed particles of the colorant is measured by a dynamic light scattering method.

The aqueous colorant dispersion of the invention is useful as, for example, an aqueous ink for inkjet recording as will be described below, or an aqueous ink for writing instruments such as aqueous ballpoint pens and marking pens. In this case, in order to prevent clogging of inkjet nozzles or pen heads by drying, a low-volatile or nonvolatile solvent selected from the above-described water-soluble organic solvents may be added to the aqueous colorant dispersion. In addition, in order to improve permeability into a recording medium, a volatile solvent may be added.

(Aqueous Ink for Inkjet Recording)

The aqueous ink for inkjet recording (hereinafter may be referred to as "inkjet ink") of the invention contains the aqueous colored dispersion of the invention.

The aqueous colorant dispersion of the invention may be used as the inkjet ink of the invention, or may be mixed with the above-described anti-drying agent or other additives, and then diluted with the aqueous liquid medium (I) to prepare the inkjet ink.

The content of the colorant contained in the inkjet ink is preferably from 0.1 to 20% by mass, and more preferably from 0.5 to 10% by mass from the viewpoints of the ink coloring properties, storage stability, and ejection properties.

The amount of the polymer (B) contained in the inkjet ink is preferably from 1 to 150% by mass, and more preferably from 5 to 100% by mass with respect to the pigment (colorant), from the viewpoints of the dispersibility, storage stability, and ejection properties of the aqueous ink.

The pH of the inkjet ink is preferably from 7 to 10. When the pH is within the range, the inkjet ink has improved storage stability, and prevents the corrosion of the inkjet recording apparatus loaded with the inkjet ink.

The pH of the inkjet ink may be adjusted with the basic substance listed in the section of the aqueous colorant dispersion.

In order to prevent clogging of inkjet nozzles by drying, the inkjet ink of the invention preferably contains a low-volatile or nonvolatile solvent selected from the above-described water-soluble organic solvents. In addition, the inkjet ink of the invention preferably contains a volatile solvent thereby improving permeability into a recording medium, and also preferably contains a surfactant thereby achieving an adequate surface tension of the ink.

According to the invention, the following embodiments <1> to <15> are provided.

<1> An aqueous colorant dispersion comprising a colorant (A), a polymer (B), and an aqueous liquid medium (I), wherein the polymer (B) is a copolymer including a hydrophilic structural unit and a hydrophobic structural unit, the content of the hydrophobic structural unit in the polymer (B) being more than 80% by mass but less than 100% by mass, the hydrophobic structural unit includes a hydrophobic structural unit (a) having an aromatic ring linked via a linking group to an atom included in the main chain of the polymer (B), the content of aromatic rings in the polymer (B) is 10% by mass or more but less than 20% by mass with respect to the mass of the polymer (B), the hydrophilic structural unit includes a hydrophilic structural unit (b) including an ionic group, and the polymer (B) includes a structural unit (c) different from the hydrophobic structural unit (a) and from the hydrophilic structural unit (b), the content of the structural unit (c) in the polymer (B) being more than 15% by mass but less than 90% by mass.

<2> The aqueous colorant dispersion of <1>, wherein the hydrophobic structural unit (a) comprises a structure represented by the following formula (1):

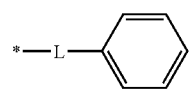

Formula (1)

wherein * represents a connecting point with the main chain, and L represents a divalent linking group having 1 to 30 carbon atoms.

<3> The aqueous colorant dispersion of <1>, wherein the hydrophobic structural unit (a) comprises a structural unit represented by the following formula (2):

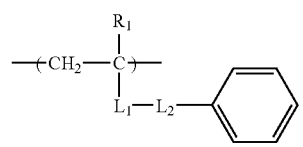

Formula (2)

wherein $R^1$ represents a hydrogen atom, a methyl group, or a halogen atom; $L_1$ represents —COO—, —OCO—, —CONR$_2$—, —O—, or a substituted or unsubstituted phenylene group; $R_2$ represents a hydrogen atom or an alkyl group having 1 to 10 carbon atoms; and $L_2$ represents a single bond or a divalent linking group having 1 to 30 carbon atoms.

<4> The aqueous colorant dispersion of <3>, wherein the hydrophobic structural unit (a) includes a structural unit derived from phenoxyethyl acrylate or phenoxyethyl methacrylate.

<5> The aqueous colorant dispersion of <4>, wherein the total content of the structural unit derived from phenoxyethyl acrylate or phenoxyethyl methacrylate in the polymer (B) is 40% by mass or more but less than 53% by mass.

<6> The aqueous colorant dispersion of <1>, wherein the ionic group included in the hydrophilic structural unit (b) is an anionic group.

<7> The aqueous colorant dispersion of <6>, wherein the anionic group is at least one selected from the group consisting of a carboxyl group, a phosphoric acid group, and a sulfonic acid group.

<8> The aqueous colorant dispersion of <1>, wherein the hydrophilic structural unit (b) includes a structural unit derived from acrylic acid or methacrylic acid.

<9> The aqueous colorant dispersion of <1>, wherein the acid value of the polymer (B) is 10 mg KOH/g or more but less than 85 mg KOH/g.

<10> The aqueous colorant dispersion of <1>, wherein the acid value of the polymer (B) is 70 mg KOH/g or more but less than 80 mg KOH/g.

<11> The aqueous colorant dispersion of <1>, wherein the structural unit (c) includes a hydrophobic structural unit derived from a C1 to C6 alkyl acrylate or methacrylate.

<12> The aqueous colorant dispersion of <1>, wherein the structural unit (c) includes a hydrophobic structural unit derived from at least one selected from the group consisting of methyl acrylate, methyl methacrylate, ethyl acrylate, and ethyl methacrylate.

<13> The aqueous colorant dispersion of <1>, wherein the colorant (A) is a pigment.

<14> A method for producing the aqueous colorant dispersion of <1>, comprising adding an aqueous solution (III) containing a basic substance to a mixture (II) containing the colorant (A), the polymer (B), and an organic solvent (C) capable of dissolving or dispersing the polymer (B), and then removing the organic solvent (C) therefrom.

<15> An aqueous ink for inkjet recording, comprising the aqueous colorant dispersion of <1>.

Therefore, according to the invention, there are provided an aqueous colorant dispersion which contains a finely dispersed colorant and is excellent in stability over time, ejection stability and recovery characteristics, and a method for producing the aqueous colorant dispersion.

There is also provided an aqueous ink for inkjet recording which contains the aqueous colorant dispersion and is excellent in ejection stability and recovery characteristics.

EXAMPLES

The invention is further described below with reference to the following examples. However, the scope of the invention will not be limited to the following specific examples.

Synthesis Example 1

Synthesis of B-1

Compound B-1 was synthesized according to the following scheme.

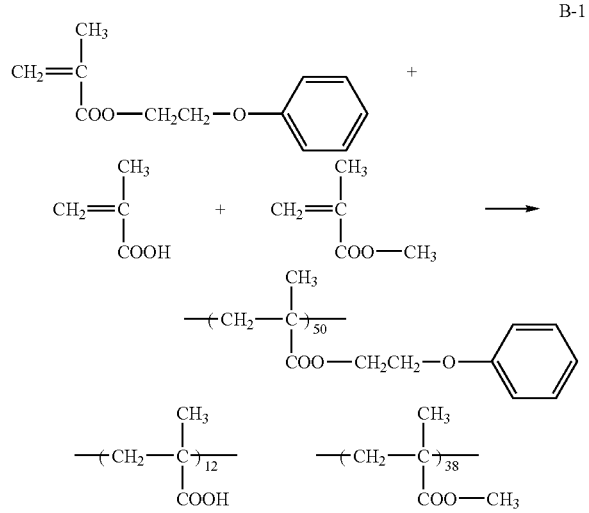

Into a 500-ml three-necked flask equipped with a stirrer and a cooling tube, 88 g of methyl ethyl ketone was added, and heated to 75° C. in a nitrogen atmosphere. Into the flask, a solution prepared by dissolving 1.2 g of dimethyl 2,2'-azobisisobutylate, 50 g of phenoxyethyl methacrylate, 12 g of methacrylic acid, and 38 g of methyl methacrylate in 50 g of methyl ethyl ketone was added dropwise over a period of 3 hours. After completion of the addition, the reaction was continued for further one hour, and then a solution prepared by dissolving 0.36 g of dimethyl-2,2'-azobisisobutylate in 2 g of methyl ethyl ketone was added into the flask, and the solution was heated at 78° C. for 4 hours. The reaction solution thus obtained was reprecipitated twice in excess amounts of hexane, and the precipitated polymer was dried to obtain 98 g of B-1.

The composition of the polymer thus obtained was confirmed by $^1$H-NMR. Its weight average molecular weight (Mw) was 42000 as determined by GPC. The acid value of the polymer was 78.3 mgKOH/g as determined by the method described in Japanese Industrial Standard (JIS K 0070:1992).

Synthesis of the other polymers in the invention may be carried out in the same manner as described above. The molecular weight was controlled by changing the amount of the dimethyl 2,2'-azobisisobutylate used as the initiator.

Synthesis Example 2

Synthesis of Comparative Compound C-1

Comparative Compound C-1 was synthesized according to the following scheme.

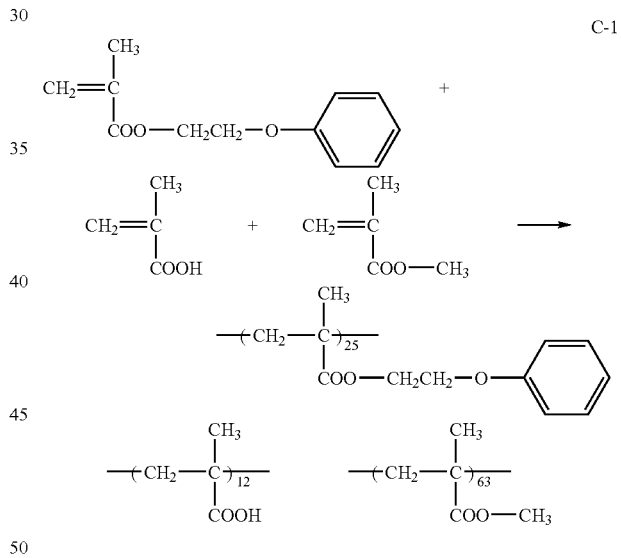

Comparative Compound C-1 was synthesized in the same manner as in Synthesis Example 1, except that 50 g of phenoxyethyl methacrylate was replaced with 25 g of phenoxyethyl methacrylate, and 38 g of methyl methacrylate was replaced with 63 g of methyl methacrylate.

The composition of the polymer thus obtained was confirmed by $^1$H-NMR. Its weight average molecular weight (Mw) was 43500 as determined by GPC. The acid value of the polymer was 78.2 mgKOH/g as determined by the method described in Japanese Industrial Standard (JIS K 0070:1992).

Synthesis Example 3

Synthesis of Comparative Compound C-2

Comparative Compound C-2 was synthesized according to the following scheme.

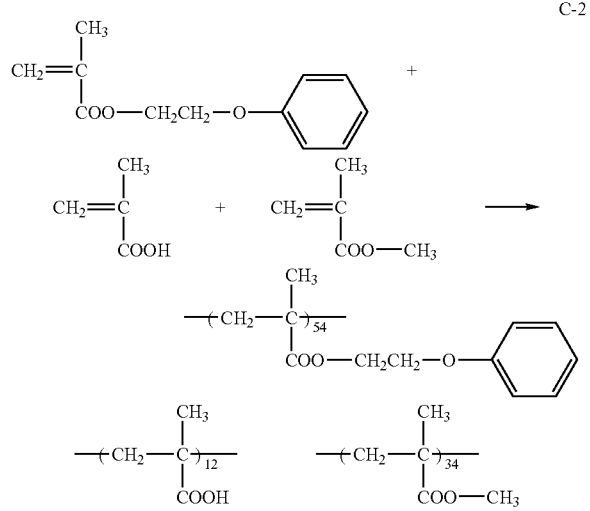

Comparative Compound C-2 was synthesized in the same manner as in Synthesis Example 1, except that 50 g of phenoxyethyl methacrylate was replaced with 54 g of phenoxyethyl methacrylate, and 38 g of methyl methacrylate was replaced with 34 g of methyl methacrylate.

The composition of the polymer thus obtained was confirmed by $^1$H-NMR. Its weight average molecular weight (Mw) was 42200 as determined by GPC. The acid value of the polymer was 78.3 mgKOH/g as determined by the method described in Japanese Industrial Standard (JIS K 0070:1992).

Synthesis Example 4

Synthesis of Comparative Compound C-3

Comparative Compound C-3 was synthesized according to the following scheme.

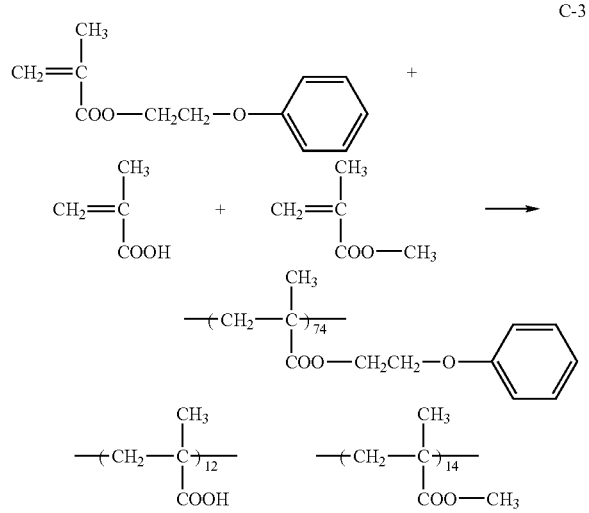

Comparative Compound C-3 was synthesized in the same manner as in Synthesis Example 1, except that 50 g of phenoxyethyl methacrylate was replaced with 74 g of phenoxyethyl methacrylate, and 38 g of methyl methacrylate was replaced with 14 g of methyl methacrylate.

The composition of the polymer thus obtained was confirmed by $^1$H-NMR. Its weight average molecular weight (Mw) was 41800 as determined by GPC. The acid value of the polymer was 78.1 mgKOH/g as determined by the method described in Japanese Industrial Standard (JIS K 0070:1992).

Example 1

Preparation of Dispersion of Pigment-Containing Resin Particles (Pigment Dispersion (D-1))

10 parts by mass of Pigment Blue 15:3 (PB15:3, trade name: PHTHALOCYANINE BLUE A220, manufactured by Dainichiseika Color & Chemicals Mfg. Co., Ltd.), 5 parts by mass of B-1, 42 parts by mass of methyl ethyl ketone, 5.5 parts by mass of 1N NaOH aqueous solution, and 87.2 parts by mass of ion exchange water were mixed together, and dispersed for 2 to 6 hours in a bead mill together with zirconia beads having a diameter of 0.1 mm.

The methyl ethyl ketone was removed from the obtained dispersion at 55° C. under reduced pressure, and part of water was removed to obtain a dispersion of pigment-containing resin particles having a pigment concentration of 10.2% by mass. The dispersion was further centrifuged at 5000 rpm for 30 minutes using a centrifugal machine (trade name: 05P-21, manufactured by Hitachi, Ltd.), and then ion exchange water was added thereto to make a pigment dispersion having a pigment concentration of 15% by mass. The dispersion was filtered under pressure through a 2.5 μm membrane filter (manufactured by Advantec Toyo Kaisha, Ltd.), and then ion exchange water was added to obtain a pigment dispersion (D-1) of the invention having a pigment concentration of 4% by mass.

Example 2

Preparation of Pigment Dispersions (D-2) to (D-40)

The pigment dispersions (D-2) to (D-40) were prepared in the same manner as in the preparation of the pigment dispersion (D-1) in Example 1, except that B-1 and Pigment Blue 15:3 were replaced with the ingredients listed in Table 1.

Details about the pigments listed in Table 1 are as follows.

C. I. Pigment Red 122 (PR122, trade name: CROMOPHTAL JET MAGENTA DMQ, manufactured by Ciba Specialty Chemicals)

C. I. Pigment Yellow 74 (PY74, trade name: IRGALITE YELLOW GS, manufactured by Ciba Specialty Chemicals)

Carbon Black (CB, trade name: NIPEX180-IQ, manufactured by Degussa)

Example 3

Preparation of Aqueous Ink

Using the pigment dispersion (D-1) prepared above, a composition containing the pigment dispersion was prepared according to the following. The composition was centrifuged at 10000 to 20000 rpm for 30 minutes to 2 hours to obtain an aqueous ink (J-1) for inkjet recording.

| | |
|---|---|
| Pigment dispersion (D-1) | 40 parts by mass |
| Glycerin | 7 parts by mass |
| Diethylene glycol | 9 parts by mass |
| Triethanolamine | 1 part by mass |

-continued

| OLFIN E1010 (manufactured by Nisshin Chemical Industry Co.) | 1 part by mass |
| Triethylene glycol monobutyl ether | 9 parts by mass |
| Ion exchange water | 34 parts by mass |

The aqueous ink had a pH of 8.6 as measured with a pH meter (trade name: WM-50EG, manufactured by DKK-Toa Corporation).

In the same manner, aqueous inks (J-2) to (J-40) were prepared from corresponding pigment dispersions (D-2) to (D-40).

Comparative Example 1

Preparation of Pigment Dispersions (D-41) to (D-45)

Pigment dispersions (D-41) and (D-42) were prepared in the same manner as in the preparation of the pigment dispersion (D-1) in example 1, except that B-1 was replaced with the copolymer described in [2038] of US2005/0124726A1 (hereinafter referred to as DM-4) and the copolymer PD-1 described in [0036] to [0037] of US2006/0014855A1, respectively.

Further, pigment dispersions (D-43) to (D-45) were prepared in the same manner as in the preparation of the pigment dispersion (D-1), except that B-1 was replaced with the compound C-1 described in Synthesis Example 2, the compound C-2 in Synthesis Example 3, and the Compound C-3 in Synthesis Example 4, respectively.

Comparative Example 2

Preparation of Aqueous Inks (J-41) to (J-45)

Aqueous inks (J-41) to (J-45) were prepared in the same manner as in Example 3, except that the pigment dispersion (D-1) was replaced with the pigment dispersions (D-41) to (D-45), respectively.

[Evaluation of Pigment Dispersions (Aqueous Colorant Dispersions)]

(1) Measurement of Average Particle Diameter

The volume average particle diameter of the pigment dispersion was measured with a NANOTRAC particle size distribution analyzer (trade name: UPA-EX150, manufactured by Nikkiso Co., Ltd.) by a dynamic light scattering method. The result is listed in Table 1.

<Measurement Conditions>

10 ml of ion exchange water was added to 10 µl of a dispersion to make a sample solution, and the particle diameter was measured at 25° C.

(2) Stability Over Time of Pigment Dispersion

Stability over time was evaluated under the following two types of test conditions.

2-1) The obtained pigment dispersions were allowed to stand at 65° C. for 18 days in a closed state, and then the average particle diameter and viscosity of the pigment particles were measured to examine their aggregation and thickening. The pigment dispersions were rated by the following criteria.

A: no change in the average particle diameter or viscosity of pigment particles

B: slight change in the average particle diameter or viscosity of pigment particles, presenting no practical problem C: marked change in the average particle diameter or viscosity of pigment particles, presenting practical problem The average particle diameter was measured in the same manner as in the above (1), and the viscosity was measured according to the following procedure. The evaluation results are listed Table 1, titled Stability over time–1.

2-2) The pigment dispersions were allowed to stand at 60° C. for 28 days in a closed state, and then the average particle diameter and viscosity of the pigment particles were measured to examine their aggregation and thickening. The dispersions were rated by the following criteria.

A: no change in the average particle diameter or viscosity of pigment particles

B: slight change in the average particle diameter or viscosity of pigment particles, presenting no practical problem C: marked change in the average particle diameter or viscosity of pigment particles, presenting practical problem The average particle diameter was measured in the same manner as in the above (1), and the viscosity was measured according to the following procedure. The evaluation results are listed in Table 1, titled Stability over time–2.

(3) Measurement of Viscosity

The viscosity of the pigment dispersions was measured at 25° C. using a TV-22 viscometer (manufactured by Toki Sangyo Co., Ltd.).

[Evaluation of Aqueous Inks for Inkjet Recording]

Suitability of the aqueous inks (J-1) to (J-45) as aqueous inks for inkjet recording was examined using an inkjet recording apparatus having a prototype print head having 600 dpi and 256 nozzles.

(1) Evaluation of Ejection Stability

During printing using the above-described inkjet recording apparatus, the printed materials were observed from the initiation to completion of the printing to determine the frequency of the occurrence of the deviation of ink flight and the generation of mist. The evaluation was made by the following criteria.

—Criteria—

A Low frequency to the extent of no practical problem

B Not so high, but higher frequency than that rated as A, potentially presenting practical problem where high quality image is demanded C High frequency presenting practical problem (2) Evaluation of Ejection Recovery Characteristics After printing using the inkjet recording apparatus, the apparatus was allowed to stand in air at 25° C., 65% RH for 3 weeks with the head portion uncovered. Thereafter, ink ejection was carried out again, and the ejection condition was observed, and rated by the following criteria.

—Criteria—

A Reejection is enabled after predetermined maintenance

B Reejection cannot be enabled by predetermined maintenance

The predetermined maintenance refers to an operation of removing the clogging of heads by ejecting an ink with a pressure of 15 Pa.

TABLE 1

| Aqueous ink | Pigment dispersion | Dispersant polymer Name | Content of aromatic ring (% by mass) | Content of structural unit (c) (% by mass) | Content of hydrophobic structural unit (% by mass) | Acid value (mgKOH/g) | Pigment |
|---|---|---|---|---|---|---|---|
| J-1 | D-1 | B-1 | 18.9 | 38 | 88 | 78.3 | PB15:3 |
| J-2 | D-2 | B-7 | 18.2 | 42 | 90 | 65.0 | PB15:3 |
| J-3 | D-3 | B-9 | 16.5 | 40 | 90 | 65.3 | PB15:3 |
| J-4 | D-4 | B-13 | 17.3 | 16 | 88 | 78.3 | PB15:3 |
| J-5 | D-5 | B-14 | 12.0 | 40 | 90 | 77.7 | PB15:3 |
| J-6 | D-6 | B-17 | 14.9 | 20 | 90 | 65.3 | PB15:3 |
| J-7 | D-7 | B-22 | 10.4 | 35 | 90 | 71.4 | PB15:3 |
| J-8 | D-8 | B-36 | 18.7 | 40 | 90 | 78.1 | PB15:3 |
| J-9 | D-9 | B-39 | 18.2 | 40 | 90 | 65.5 | PB15:3 |
| J-10 | D-10 | B-51 | 18.9 | 39 | 89 | 71.8 | PB15:3 |
| J-11 | D-11 | B-53 | 18.9 | 37.8 | 87.8 | 79.5 | PB15:3 |
| J-12 | D-12 | B-55 | 19.9 | 36.5 | 89 | 71.5 | PB15:3 |
| J-13 | D-13 | B-56 | 18.9 | 37 | 87 | 84.7 | PB15:3 |
| J-14 | D-14 | B-58 | 15.1 | 50 | 90 | 65.5 | PB15:3 |
| J-15 | D-15 | B-59 | 14.4 | 51 | 89 | 71.2 | PB15:3 |
| J-16 | D-16 | B-60 | 19.1 | 43 | 90 | 77.6 | PB15:3 |
| J-17 | D-17 | B-62 | 16.3 | 51 | 91 | 70.2 | PB15:3 |
| J-18 | D-18 | B-63 | 19.1 | 47 | 89.7 | 80.6 | PB15:3 |
| J-19 | D-19 | B-1 | 18.9 | 38 | 88 | 78.3 | PR122 |
| J-20 | D-20 | B-51 | 18.9 | 39 | 89 | 71.8 | PR122 |
| J-21 | D-21 | B-1 | 18.9 | 38 | 88 | 78.3 | PY74 |
| J-22 | D-22 | B-51 | 18.9 | 39 | 89 | 71.8 | PY74 |
| J-23 | D-23 | B-53 | 18.9 | 37.8 | 87.8 | 79.5 | PY74 |
| J-24 | D-24 | B-55 | 19.9 | 36.5 | 89 | 71.5 | PY74 |
| J-25 | D-25 | B-56 | 18.9 | 37 | 87 | 84.7 | PY74 |
| J-26 | D-26 | B-58 | 15.1 | 50 | 90 | 65.5 | PY74 |
| J-27 | D-27 | B-59 | 14.4 | 51 | 89 | 71.2 | PY74 |
| J-28 | D-28 | B-60 | 19.1 | 43 | 90 | 77.6 | PY74 |
| J-29 | D-29 | B-62 | 16.3 | 51 | 91 | 70.2 | PY74 |
| J-30 | D-30 | B-63 | 19.1 | 47 | 89.7 | 80.6 | PY74 |
| J-31 | D-31 | B-1 | 18.9 | 38 | 88 | 78.3 | CB |
| J-32 | D-32 | B-51 | 18.9 | 39 | 89 | 71.8 | CB |
| J-33 | D-33 | B-53 | 18.9 | 37.8 | 87.8 | 79.5 | CB |
| J-34 | D-34 | B-55 | 19.9 | 36.5 | 89 | 71.5 | CB |
| J-35 | D-35 | B-56 | 18.9 | 37 | 87 | 84.7 | CB |
| J-36 | D-36 | B-58 | 15.1 | 50 | 90 | 65.5 | CB |
| J-37 | D-37 | B-59 | 14.4 | 51 | 89 | 71.2 | CB |
| J-38 | D-38 | B-60 | 19.1 | 43 | 90 | 77.6 | CB |
| J-39 | D-39 | B-62 | 16.3 | 51 | 91 | 70.2 | CB |
| J-40 | D-40 | B-63 | 19.1 | 47 | 89.7 | 80.6 | CB |
| J-41 | D-41 | DM-4 | 45.0 | 94 | 69 | 37.0 | PB15:3 |
| J-42 | D-42 | PD-1 | 33.9 | 0 | 67 | 215 | PB15:3 |
| J-43 | D-43 | C-1 | 9.5 | 63 | 88 | 78.2 | PB15:3 |
| J-44 | D-44 | C-2 | 20.4 | 34 | 88 | 78.3 | PB15:3 |
| J-45 | D-45 | C-3 | 18.9 | 14 | 88 | 78.1 | PB15:3 |

| Aqueous ink | Evaluation of pigment dispersion Average particle diameter [nm] | Stability over time-1 | Stability over time-2 | Evaluation of aqueous ink Ejection stability | Ejection recovery characteristics | Remarks |
|---|---|---|---|---|---|---|
| J-1 | 110 | A | A | A | A | The invention |
| J-2 | 102 | A | B | A | A | The invention |
| J-3 | 105 | A | B | A | A | The invention |
| J-4 | 112 | A | B | A | A | The invention |
| J-5 | 111 | A | B | A | A | The invention |
| J-6 | 108 | A | B | A | A | The invention |
| J-7 | 98 | A | B | A | A | The invention |
| J-8 | 100 | A | A | A | A | The invention |
| J-9 | 99 | A | B | A | A | The invention |
| J-10 | 98 | A | A | A | A | The invention |
| J-11 | 97 | A | A | A | A | The invention |
| J-12 | 95 | A | A | A | A | The invention |
| J-13 | 101 | A | B | A | A | The invention |
| J-14 | 120 | A | B | A | A | The invention |
| J-15 | 125 | A | B | A | A | The invention |
| J-16 | 101 | A | A | A | A | The invention |

TABLE 1-continued

| | | | | | | |
|---|---|---|---|---|---|---|
| J-17 | 118 | A | A | A | A | The invention |
| J-18 | 99 | A | B | A | A | The invention |
| J-19 | 89 | A | A | A | A | The invention |
| J-20 | 88 | A | A | A | A | The invention |
| J-21 | 119 | A | A | A | A | The invention |
| J-22 | 98 | A | A | A | A | The invention |
| J-23 | 97 | A | A | A | A | The invention |
| J-24 | 95 | A | A | A | A | The invention |
| J-25 | 101 | A | B | A | A | The invention |
| J-26 | 120 | A | B | A | A | The invention |
| J-27 | 125 | A | B | A | A | The invention |
| J-28 | 101 | A | A | A | A | The invention |
| J-29 | 118 | A | A | A | A | The invention |
| J-30 | 99 | A | B | A | A | The invention |
| J-31 | 110 | A | A | A | A | The invention |
| J-32 | 108 | A | A | A | A | The invention |
| J-33 | 105 | A | A | A | A | The invention |
| J-34 | 110 | A | A | A | A | The invention |
| J-35 | 108 | A | B | A | A | The invention |
| J-36 | 112 | A | B | A | A | The invention |
| J-37 | 99 | A | B | A | A | The invention |
| J-38 | 103 | A | A | A | A | The invention |
| J-39 | 100 | A | A | A | A | The invention |
| J-40 | 98 | A | B | A | A | The invention |
| J-41 | 241 | C | C | C | B | Comparative Example |
| J-42 | 180 | C | C | C | B | Comparative Example |
| J-43 | 503 | C | C | C | B | Comparative Example |
| J-44 | 109 | B | C | A | B | Comparative Example |
| J-45 | 105 | B | C | B | B | Comparative Example |

As is evident from Table 1, the pigment dispersion (aqueous colorant dispersion) of the invention had a fine dispersion particle diameter of the pigment, and exhibited good stability over time.

In addition, the aqueous ink (aqueous ink for inkjet recording) of the invention exhibited good ejection stability and ejection recovery characteristics.

On the other hand, the pigment dispersions D-41 to D-43 and aqueous inks J-41 to J-43 of comparative examples were inferior in all the evaluation items. The pigment dispersions D-44 and D-45 of comparative examples had fine dispersion particle diameters of the pigment, but were inferior in stability over time. Regarding the ejection properties of the aqueous inks J-44 and J-45, their ejection stability was equal or slightly inferior, and ejection recovery characteristic was markedly inferior to those of the aqueous ink of the invention.

All publications, patent applications, and technical standards mentioned in this specification are herein incorporated by reference to the same extent as if each individual publication, patent application, or technical standard was specifically and individually indicated to be incorporated by reference.

What is claimed is:

1. An aqueous colorant dispersion comprising a colorant (A), a polymer (B), and an aqueous liquid medium (I), wherein
the polymer (B) is a copolymer including a hydrophilic structural unit and a hydrophobic structural unit, the content of the hydrophobic structural unit in the polymer (B) being more than 80% by mass but less than 100% by mass,
the hydrophobic structural unit includes a hydrophobic structural unit (a) having an aromatic ring linked via a linking group to an atom included in the main chain of the polymer (B),
the content of aromatic rings in the polymer (B) is 10% by mass or more but less than 20% by mass with respect to the mass of the polymer (B),
the hydrophilic structural unit includes a hydrophilic structural unit (b) including an ionic group, and
the polymer (B) includes a structural unit (c) different from the hydrophobic structural unit (a) and from the hydrophilic structural unit (b), the content of the structural unit (c) in the polymer (B) being more than 15% by mass but 45% by mass or less,
wherein the structural unit (c) includes a hydrophobic structural unit derived from a C1 to C6 alkyl acrylate or methacrylate,
wherein the hydrophobic structural unit (a) comprises a structural unit represented by the following formula (2):

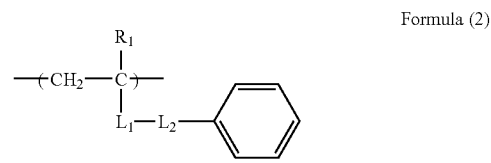

Formula (2)

wherein $R^1$ represents a methyl group; $L_1$ represents —COO—, —OCO—, —CONR$_2$—, —O—, or a substituted or unsubstituted phenylene group; $R_2$ represents a hydrogen atom or an alkyl group having 1 to 10 carbon atoms; and $L_2$ represents a single bond or a divalent linking group having 1 to 30 carbon atoms.

2. The aqueous colorant dispersion of claim 1, wherein the hydrophobic structural unit (a) includes a structural unit derived from phenoxyethyl methacrylate.

3. The aqueous colorant dispersion of claim 2, wherein the total content of the structural unit derived from phenoxyethyl methacrylate in the polymer (B) is 40% by mass or more but less than 53% by mass.

4. The aqueous colorant dispersion of claim 1, wherein the ionic group included in the hydrophilic structural unit (b) is an anionic group.

5. The aqueous colorant dispersion of claim 4, wherein the anionic group is at least one selected from the group consisting of a carboxyl group, a phosphoric acid group, and a sulfonic acid group.

6. The aqueous colorant dispersion of claim 1, wherein the hydrophilic structural unit (b) includes a structural unit derived from acrylic acid or methacrylic acid.

7. The aqueous colorant dispersion of claim 1, wherein the acid value of the polymer (B) is 10 mg KOH/g or more but less than 85 mg KOH/g.

8. The aqueous colorant dispersion of claim 1, wherein the acid value of the polymer (B) is 70 mg KOH/g or more but less than 80 mg KOH/g.

9. The aqueous colorant dispersion of claim 1, wherein the structural unit (c) includes a hydrophobic structural unit derived from at least one selected from the group consisting of methyl acrylate, methyl methacrylate, ethyl acrylate, and ethyl methacrylate.

10. The aqueous colorant dispersion of claim 1, wherein the colorant (A) is a pigment.

11. A method for producing the aqueous colorant dispersion of claim 1, comprising adding an aqueous solution (III) containing a basic substance to a mixture (II) containing the colorant (A), the polymer (B), and an organic solvent (C) capable of dissolving or dispersing the polymer (B), and then removing the organic solvent (C) therefrom.

12. An aqueous ink for inkjet recording, comprising the aqueous colorant dispersion of claim 1.

13. The aqueous colorant dispersion of claim 1, wherein the content of the structural unit (c) in the polymer (B) is more than 15% by mass but 40% by mass or less.

* * * * *